US010357998B2

(12) United States Patent
Thomasson et al.

(10) Patent No.: US 10,357,998 B2
(45) Date of Patent: Jul. 23, 2019

(54) TIRE TREAD

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Damien Thomasson, Clermont-Ferrand (FR); Perrine Vallat, Clermont-Ferrand (FR); Jean-Philippe Weber, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 16 days.

(21) Appl. No.: 15/537,098

(22) PCT Filed: Dec. 14, 2015

(86) PCT No.: PCT/EP2015/079563
§ 371 (c)(1),
(2) Date: Jun. 16, 2017

(87) PCT Pub. No.: WO2016/096704
PCT Pub. Date: Jun. 23, 2016

(65) Prior Publication Data
US 2018/0257432 A1  Sep. 13, 2018

(30) Foreign Application Priority Data

Dec. 19, 2014  (FR) ...................... 14 62894

(51) Int. Cl.
| *B60C 1/00* | (2006.01) |
| *C08K 5/548* | (2006.01) |
| *C08K 5/47* | (2006.01) |
| *C08K 5/18* | (2006.01) |
| *C08K 5/00* | (2006.01) |
| *C08K 3/36* | (2006.01) |
| *C08L 47/00* | (2006.01) |
| *C08K 3/04* | (2006.01) |
| *C08L 7/00* | (2006.01) |
| *C08K 3/06* | (2006.01) |
| *C08K 3/22* | (2006.01) |
| *C08K 5/09* | (2006.01) |
| *C08L 9/00* | (2006.01) |
| *C08F 36/06* | (2006.01) |
| *C08F 36/08* | (2006.01) |

(52) U.S. Cl.
CPC ............. *B60C 1/0016* (2013.01); *C08K 3/36* (2013.01); *C08K 5/0016* (2013.01); *C08K 5/18* (2013.01); *C08K 5/47* (2013.01); *C08K 5/548* (2013.01); *C08L 47/00* (2013.01); *C08F 36/06* (2013.01); *C08F 36/08* (2013.01); *C08K 3/04* (2013.01); *C08K 3/06* (2013.01); *C08K 3/22* (2013.01); *C08K 5/09* (2013.01); *C08L 7/00* (2013.01); *C08L 9/00* (2013.01); *C08L 2312/02* (2013.01)

(58) Field of Classification Search
CPC ............... B60C 1/00; C08K 3/36; C08K 5/47
USPC ........................................................ 524/492
See application file for complete search history.

(56) References Cited

U.S. PATENT DOCUMENTS

| 5,977,238 A | 11/1999 | Labauze ....................... 524/492 |
| 6,013,718 A | 1/2000 | Cabioch et al. .............. 524/506 |
| 6,503,973 B2 | 1/2003 | Robert et al. ................. 524/492 |
| 6,610,261 B1 | 8/2003 | Custodero et al. ........... 423/127 |
| 6,747,087 B2 | 6/2004 | Custodero et al. ........... 524/497 |
| 6,815,473 B2 | 11/2004 | Robert et al. ................. 523/215 |
| 7,199,175 B2 | 4/2007 | Vasseur ......................... 524/492 |
| 7,250,463 B2 | 7/2007 | Durel et al. ................... 524/492 |
| 7,312,264 B2 | 12/2007 | Gandon-Pain ................ 524/236 |
| 7,820,771 B2 | 10/2010 | Lapra et al. ................... 525/479 |
| 7,900,667 B2 | 3/2011 | Vasseur ....................... 152/209.1 |
| 8,058,339 B2 | 11/2011 | Taguchi et al. ............... 524/432 |
| 8,344,063 B2 | 1/2013 | Marechal et al. ............. 524/571 |
| 8,394,903 B2 | 3/2013 | Marechal ...................... 526/176 |
| 8,455,584 B2 | 6/2013 | Robert et al. ................. 524/505 |
| 8,492,479 B2 | 7/2013 | Robert et al. ................... 525/89 |
| 9,499,730 B2 | 11/2016 | Joseph, Jr. et al. ......... C09K 5/14 |
| 2001/0036991 A1 | 11/2001 | Robert et al. ................. 524/492 |
| 2003/0212185 A1 | 11/2003 | Vasseur ......................... 524/492 |
| 2005/0004297 A1 | 1/2005 | Durel et al. ................... 524/493 |
| 2005/0016650 A1* | 1/2005 | Durel .................... B60C 1/0016 152/209.1 |
| 2006/0089445 A1 | 4/2006 | Gandon-Pain ................ 524/492 |

(Continued)

FOREIGN PATENT DOCUMENTS

| EP | 1 127 909 A1 | 8/2001 |
| EP | 2 147 951 A1 | 1/2010 |

(Continued)

OTHER PUBLICATIONS

Office Action dated Feb. 26, 2018, in counterpart CN application No. 201580068358.0 (18 pages).

(Continued)

*Primary Examiner* — Deve E Valdez

(74) *Attorney, Agent, or Firm* — Venable LLP

(57) ABSTRACT

A tire tread comprises a rubber composition based on at least one natural or synthetic polyisoprene, at a content ranging from 50 phr to 100 phr, a reinforcing filler comprising predominantly, by weight, inorganic filler, a coupling agent, a plasticizing agent at a content of less than or equal to 10 phr and a sulphur-based crosslinking system. The composition contains a zinc content ranging from 0.7 to 2 phr.

14 Claims, No Drawings

(56) References Cited

U.S. PATENT DOCUMENTS

| | | | |
|---|---|---|---|
| 2007/0112120 A1 | 5/2007 | Vasseur | 524/492 |
| 2008/0132644 A1 | 6/2008 | Lapra et al. | 525/105 |
| 2009/0270558 A1 | 10/2009 | Gandon-Pain et al. | 525/190 |
| 2010/0130663 A1 | 5/2010 | Taguchi et al. | 524/432 |
| 2010/0184912 A1 | 7/2010 | Marechal et al. | 524/571 |
| 2010/0249270 A1 | 9/2010 | Robert et al. | 523/150 |
| 2010/0252156 A1 | 10/2010 | Robert et al. | 152/209.1 |
| 2010/0317795 A1* | 12/2010 | Araujo Da Silva | B60C 1/0016 524/575.5 |
| 2011/0251354 A1 | 10/2011 | Marechal | 525/370 |
| 2015/0184054 A1 | 7/2015 | Joseph, Jr. et al. | C09K 5/14 |
| 2015/0306912 A1* | 10/2015 | Darnaud | C08K 3/04 524/100 |

FOREIGN PATENT DOCUMENTS

| | | |
|---|---|---|
| EP | 3075771 A1 | 10/2016 |
| EP | 3075774 A1 | 10/2016 |
| EP | 3178880 A1 | 6/2017 |
| FR | 2 740 778 A1 | 5/1997 |
| FR | 2 765 882 A1 | 1/1999 |
| FR | 2 992 322 A1 | 12/2013 |
| JP | 2009-298920 A | 12/2009 |
| WO | 97/36724 A2 | 10/1997 |
| WO | 99/16600 A1 | 4/1999 |
| WO | 01/92402 A1 | 12/2001 |
| WO | 02/10269 A1 | 2/2002 |
| WO | 03/16387 A1 | 2/2003 |
| WO | 2004/096865 A2 | 11/2004 |
| WO | 2006/069792 A1 | 7/2006 |
| WO | 2006/069793 A1 | 7/2006 |
| WO | 2008/141702 A1 | 11/2008 |
| WO | 2009/000750 A1 | 12/2008 |
| WO | 2009/000752 A1 | 12/2008 |
| WO | 2010/072761 A1 | 7/2010 |
| WO | WO2013/092528 * | 6/2013 |
| WO | 2013/186150 A1 | 12/2013 |

OTHER PUBLICATIONS

K.F. Gazeley, et al., Natural Rubber Science and Technology, Oxford University Press, chapter 3, "Latex concentrates: properties and composition", pp. 63-98 (1988).

* cited by examiner

TIRE TREAD

FIELD OF THE INVENTION

The present invention relates to diene rubber compositions, predominantly reinforced by an inorganic filler such as silica, which may be used for the manufacture of tyre treads, and more particularly for tyres intended to be fitted to vehicles carrying heavy loads and running at sustained speeds, for example trucks, tractors, trailers or buses, aeroplanes, etc.

RELATED ART

Some current tyres, referred to as "road" tyres, are intended to run at high speed and over increasingly long journeys, as a result of the improvement in the road network and of the growth of the motorway network throughout the world. However, since fuel savings and the need to protect the environment have become a priority, it has proved necessary to produce tyres having a reduced rolling resistance without adversely affecting their wear resistance.

It is known that the use of some specific inorganic fillers classed as "reinforcing", such as silica, having a high dispersibility capable of competing, from the reinforcing point of view, with tyre-grade carbon blacks, and also providing these compositions with reduced hysteresis, synonymous with a lower rolling resistance for the tyres comprising them.

However, numerous tread formulations for vehicles carrying heavy loads and running at sustained speeds predominantly comprise natural rubber and carbon black or a blend of reinforcing fillers (carbon black predominantly and inorganic filler such as silica). Indeed, the use of predominant inorganic filler has the drawback in combination with natural rubber of having difficulties, during vulcanization of the tyres and hence of the treads, in terms of kinetics with a phase delay which is too large and a slower vulcanization reaction rate, necessitating long curing times, or even in some cases possibly damaging the curing of other locations in the tyre.

The Applicants have discovered, surprisingly, that reducing the zinc content of the rubber formulations predominantly based on natural rubber and predominantly reinforced with an inorganic filler such as silica, without replacing the zinc with another metal, made it possible to overcome the phase delay problem, while retaining the improvements in the properties of the composition linked to the use of silica.

Indeed, the vulcanization of diene elastomers by sulphur is widely used in the rubber industry, in particular in the tyre industry. In order to vulcanize diene elastomers, use is made of a relatively complex vulcanization system comprising, in addition to the sulphur, various vulcanization accelerators and also one or more vulcanization activators, in particularly zinc derivatives, such as zinc oxide (ZnO) or zinc salts of fatty acids, such as zinc stearate.

Thus, reducing the amount of zinc is also beneficial due to the known environmental impact of these compounds, especially with respect to water and aquatic organisms (classification R50 according to European Directive 67/548/EC of 9 Dec. 1996).

Moreover, astonishingly, it has become apparent that such compositions in tyre treads made it possible to obtain gains in terms of wear for these tyres.

BRIEF DESCRIPTION OF EMBODIMENTS OF THE INVENTION

Consequently, a first subject of the invention relates to a tyre tread having a rubber composition based on at least one natural or synthetic polyisoprene, at a content ranging from 50 phr to 100 phr, a reinforcing filler comprising predominantly, by weight, inorganic filler, a coupling agent, a plasticizing agent at a content of less than or equal to 10 phr and a sulphur-based crosslinking system, characterized in that the composition contains a zinc content ranging from 0.7 to 2 phr.

Preferentially, the composition also comprises a polybutadiene, BR, or a butadiene-styrene copolymer, SBR, the content of polyisoprene ranging from 50 phr to 90 phr.

The inorganic filler preferably comprises silica, and more preferentially the inorganic filler consists of silica.

According to a preferred variant of the invention, the zinc content ranges from 1 to 1.5 phr.

According to a variant embodiment of the invention, the inorganic filler represents at least 60% by weight of the reinforcing filler, preferably at least 75% by weight and more preferentially still at least 90% by weight.

According to one embodiment of the invention, the composition comprises a BR or an SBR at a content ranging from 10 to 50 phr; the content of polyisoprene preferably ranges from 60 to 90 phr and the content of BR or SBR ranges from 10 to 40 phr.

According to another embodiment of the invention, the content of polyisoprene ranges from 50 to 80 phr and the composition comprises BR at a content of 10 to 40 phr and SBR at a content of 10 to 40 phr.

Advantageously, the content of plasticizing agent is less than or equal to 5 phr, preferably less than or equal to 2 phr.

The invention also relates to a tyre comprising a tread as described above.

I. Measurements and Tests Used

The rubber compositions are characterized, before and after curing, as indicated below.

Mooney plasticity

Use is made of an oscillating consistometer as described in French standard NF T 43-005 (November 1980). The Mooney plasticity measurement is carried out according to the following principle: the composition in the uncured state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 newton.meter).

Rheometry

The measurements are carried out at 130° C. with an oscillating disc rheometer, according to standard DIN 53529—Part 3 (June 1983). The change in the rheometric torque as a function of time describes the change in the stiffening of the composition as a result of the vulcanization reaction. The measurements are processed according to standard DIN 53529—Part 2 (March 1983): Ti is the induction period, that is to say the time necessary for the start of the vulcanization reaction; $T_\alpha$ (for example $T_{95}$) is the time necessary to achieve a conversion of α%, that is to say α% (for example 95%) of the difference between the minimum and maximum torques. The conversion rate constant, denoted K (expressed in $min^{-1}$), which is first order, calculated between 30% and 80% conversion, which makes it possible to assess the vulcanization kinetics, is also measured.

Dynamic properties

The dynamic properties $\Delta G^*$ and $\tan(\delta)_{max}$ are measured on a viscosity analyser (Metravib VA4000) according to standard ASTM D 5992-96. The response of a sample of vulcanized composition (cylindrical test specimen with a thickness of 4 mm and a cross section of 400 mm$^2$), subjected to a simple alternating sinusoidal shear stress, at a frequency of 10 Hz, under standard temperature conditions (60° C.) according to standard ASTM D 1349-99 or, as the case may be, at a different temperature, is recorded. A strain amplitude sweep is carried out from 0.1% to 100% (outward cycle) and then from 100% to 0.1% (return cycle). The results made use of are the complex dynamic shear modulus (G*) and the loss factor tan(δ). The maximum value of tan (δ) observed, denoted tan(δ)$_{max}$, and the difference in complex modulus (ΔG*) between the values at 0.1% and at 100% strain (Payne effect) are shown for the return cycle.

Wear test

In the wear test carried out on the road, the mean loss of weight of a tyre after a given distance covered is measured. The loss of weight from the control is graded 100; an index higher than 100 means that the loss of weight is less than that of the control.

II. Detailed Description of the Invention

The invention relates to a tyre tread having a rubber composition based on at least one natural or synthetic polyisoprene, at a content ranging from 50 phr to 100 phr, a reinforcing filler comprising predominantly, by weight, inorganic filler, a coupling agent, a plasticizing agent at a content of less than or equal to 10 phr and a sulphur-based crosslinking system, characterized in that the composition contains a zinc content ranging from 0 to 1 phr.

Preferentially, the composition also comprises a polybutadiene, BR, or a butadiene-styrene copolymer, SBR, the content of polyisoprene ranging from 50 phr to 90 phr.

It should be noted that, in the concept of phr: "parts by weight per hundred parts of elastomer", the combination of all of the elastomers present in the final composition is taken into consideration.

In the present description, unless expressly indicated otherwise, all the percentages (%) shown are % by weight. Furthermore, any range of values denoted by the expression "between a and b" represents the range of values extending from more than a to less than b (that is to say, limits a and b excluded), whereas any range of values denoted by the expression "from a to b" means the range of values extending from a up to b (that is to say, including the strict limits a and b).

Diene elastomer

As is customary, the terms "elastomer" and "rubber", which are interchangeable, are used without distinction in the text.

A "diene" elastomer or rubber should be understood, in a known way, as meaning an elastomer resulting at least in part (i.e., a homopolymer or a copolymer) from diene monomers (monomers bearing two conjugated or non-conjugated carbon-carbon double bonds).

These diene elastomers can be classified into two categories: "essentially unsaturated" or "essentially saturated". "Essentially unsaturated" is generally understood to mean a diene elastomer resulting at least in part from conjugated diene monomers having a content of units of diene origin (conjugated dienes) which is greater than 15% (mol %); thus, diene elastomers such as butyl rubbers or copolymers of dienes and of α-olefins of EPDM type do not come within the preceding definition and can especially be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

According to the invention, the predominant diene elastomer is preferably an isoprene elastomer, that is to say an isoprene homopolymer or copolymer, in other words a diene elastomer selected from the group consisting of natural rubber (NR), synthetic polyisoprenes (IRs), various isoprene copolymers or a mixture of these elastomers. Mention will in particular be made, among isoprene copolymers, of isobutene-isoprene (butyl rubber—IIR), isoprene-styrene (SIR), isoprene-butadiene (BIR) or isoprene-butadiene-styrene (SBIR) copolymers. This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, more preferentially still of greater than 98%.

When the composition is prepared with a liquid-phase compounding process in order to obtain masterbatches based on natural rubber and carbon black, use is made of a natural rubber latex, the elastomer latex being a specific form of the elastomer and is in the form of elastomer particles dispersed in water.

More particularly, natural rubber (NR) exists in various forms, as explained in detail in Chapter 3, "Latex concentrates: properties and composition", by K. F. Gaseley, A. D. T. Gordon and T. D. Pendle in "Natural Rubber Science and Technology", A. D. Roberts, Oxford University Press—1988.

In particular, several forms of natural rubber latex are sold: the natural rubber latexes referred to as "field latexes", the natural rubber latexes referred to as "concentrated natural rubber latexes", epoxidized latexes (ENRs), deproteinized latexes or else prevulcanized latexes. Natural rubber field latex is a latex to which ammonia has been added in order to prevent premature coagulation and concentrated natural rubber latex corresponds to a field latex which has undergone a treatment corresponding to a washing, followed by a further concentration. The various categories of concentrated natural rubber latexes are listed in particular according to standard ASTM D 1076-06. Singled out in particular among these concentrated natural rubber latexes are the concentrated natural rubber latexes of the grade referred to as: "HA" (high ammonia) and of the grade referred to as "LA"; for the invention, use will advantageously be made of concentrated natural rubber latexes of HA grade.

The NR latex can be physically or chemically modified beforehand (centrifugation, enzymatic treatment, chemical modifier, etc.).

The latex can be used directly or be diluted beforehand in water to facilitate the processing thereof.

Of course, it is possible to envisage the compositions in accordance with the invention containing a blend with another diene or non-diene elastomer.

In the group of highly unsaturated diene elastomers, polybutadienes (abbreviated to "BRs"), butadiene copolymers, isoprene copolymers and the mixtures of these elastomers are suitable in particular as such. Such copolymers are more preferentially selected from the group consisting of butadiene-styrene copolymers (SBRs), isoprene-butadiene copolymers (BIRs), isoprene-styrene copolymers (SIRs) and isoprene-butadiene-styrene copolymers (SBIRs).

The abovementioned elastomers may have any microstructure, which depends on the polymerization conditions used, especially on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. For coupling to carbon black, mention may for example be made of functional groups comprising a C—Sn bond or aminated functional groups, such as aminobenzophenone, for example; for coupling to a reinforcing inorganic filler such as silica, mention may for example be made of silanol functional groups or polysiloxane functional groups having a silanol end (such as described, for example, in FR 2 740 778 or U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973, WO 2009/000750 and WO 2009/000752).

As functional elastomers, mention may also be made of those prepared using a functional initiator, especially those bearing an amine or tin functional group (see, for example, WO 2010/072761).

Mention may also be made, as other examples of functionalized elastomers, of elastomers (such as SBR, BR, NR or IR) of the epoxidized type.

It will be noted that the SBR may be prepared as emulsion (ESBR) or as solution (SSBR). Whether it is ESBR or SSBR, use is especially made of an SBR having a moderate styrene content, for example of between 10% and 35% by weight, or a high styrene content, for example from 35% to 55%, a content of vinyl bonds of the butadiene part of between 15% and 70%, a content (mol %) of trans-1,4-bonds of between 15% and 75% and a Tg of between −10° C. and −65° C., preferably of greater than or equal to −50° C.

BRs having a content (mol %) of cis-1,4-linkages of greater than 90% are suitable as BR.

The composition advantageously comprises 100% of natural rubber or synthetic polyisoprene.

According to a preferred variant embodiment of the invention, the tread composition comprises a blend of natural rubber or of synthetic polyisoprene, at a content of 50 to 100 phr, and of BR at a content ranging from 10 to 50 phr.

The composition preferentially has a content of polyisoprene ranging from 60 to 90 phr and a content of BR ranging from 10 to 40 phr.

According to another variant embodiment of the invention, the composition comprises a blend of natural rubber or of synthetic polyisoprene, at a content of 50 to 100 phr, and of SBR at a content ranging from 10 to 50 phr.

The composition more preferably has a content of polyisoprene ranging from 60 to 90 phr and a content of SBR ranging from 10 to 40 phr.

According to another variant embodiment of the invention, the composition comprises a blend of polyisoprene and of BR or SBR, and also a third diene elastomer different from the two first elastomers, chosen from polybutadienes, styrene-butadiene copolymers, isoprene-butadiene copolymers, isoprene-styrene copolymers and isoprene-butadiene-styrene copolymers.

The composition preferably thus has a content of polyisoprene ranging from 50 to 80 phr and comprises a BR at a content of 10 to 40 phr and an SBR at a content of 10 to 40 phr.

The composition according to the invention may contain another diene elastomer. The diene elastomers of the composition may be used in combination with any type of synthetic elastomer other than a diene elastomer, indeed even with polymers other than elastomers, for example thermoplastic polymers.

Reinforcing filler—coupling agent

A reinforcing filler is understood in a known way to mean a filler known for its abilities to reinforce a rubber composition which can be used for the manufacturing of tyres. Among these reinforcing fillers are organic fillers, such as carbon black, and inorganic fillers.

The term "reinforcing inorganic filler" should be understood here to mean, in a known way, any inorganic or mineral filler, irrespective of its colour and its origin (natural or synthetic), also known as "white filler", "clear filler" or else "non-black filler", in contrast to carbon black, this inorganic filler being capable of reinforcing, by itself, without means other than an intermediate coupling agent, a rubber composition intended for the manufacture of a tyre tread, in other words capable of replacing, in its reinforcing role, a conventional tyre-grade carbon black for a tread. Such a filler is generally characterized by the presence of functional groups, especially hydroxyl (—OH) functional groups, at its surface, requiring in that regard the use of a coupling agent or system intended to provide a stable chemical bond between the elastomer and said filler.

Mention may be made, as reinforcing inorganic filler, of fillers of the siliceous type, such as silica, or of the aluminous, silica-alumina or titanium oxide type.

The total content of total reinforcing filler is preferably between 20 and 150 phr, the optimum content being different depending on the particular applications targeted, as is known. According to a favoured embodiment, the total content of reinforcing filler ranges from 30 to 90 phr, preferably from 40 to 80 phr, and even more preferentially from 45 to 70 phr.

The reinforcing filler for the composition in accordance with the invention comprises predominantly, an inorganic filler, preferably silica. The inorganic filler preferably represents at least 60% by weight of the reinforcing filler, more preferentially the inorganic filler represents at least 75% by weight of the reinforcing filler, and even more preferentially the inorganic filler represents at least 90% of the reinforcing filler.

According to a preferential embodiment of the invention, the composition optionally carbon black; when it is present, the carbon black is used at a content of less than 30 phr, preferably less than 15 phr, more preferentially less than or equal to 8 phr and even more preferentially less than or equal to 5 phr.

All reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example, N400, N660, N683 or N772), are suitable as carbon blacks. The carbon blacks might, for example, be already incorporated in the isoprene elastomer in the form of a masterbatch (see, for example, applications WO 97/36724 or WO 99/16600).

The inorganic filler preferentially comprises silica, and even more preferentially it consists of silica.

The silica used may be any reinforcing silica known to those skilled in the art, especially any precipitated or fumed silica having a BET surface area and also a CTAB specific surface area both of less than 450 m$^2$/g, preferably from 30 to 400 m$^2$/g, especially between 60 and 300 m$^2$/g. As highly dispersible precipitated silicas ("HDSs"), mention will be made, for example, of the Ultrasil 7000 and Ultrasil 7005 silicas from Degussa, the Zeosil 1165MP, Zeosil 1135MP, Zeosil 1115MP and Zeosil Premium 200 MP silicas from Rhodia, the Hi-Sil EZ150G silica from PPG, the Zeopol 8715, 8745 and 8755 silicas from Huber and the silicas having a high specific surface area as described in application WO 03/016387.

It is specified that the CTAB specific surface area is determined according to French standard NF T 45-007 of November 1987 (method B).

As reinforcing inorganic filler, mention will also be made of mineral fillers of the aluminous type, in particular alumina ($Al_2O_3$) or aluminium (oxide)hydroxides, or else reinforcing titanium oxides, for example described in U.S. Pat. Nos. 6,610,261 and 6,747,087.

The physical state in which the reinforcing inorganic filler is provided is unimportant, whether it is in the form of a powder, microbeads, granules or else beads. Of course, reinforcing inorganic filler is also understood to mean mixtures of various reinforcing inorganic fillers, in particular of highly dispersible silicas as described above.

In order to couple the reinforcing inorganic filler, especially silica, to the diene elastomer, use is made, in a known way, of an at least bifunctional coupling agent (or bonding agent) intended to provide a sufficient connection, of chemical and/or physical nature, between the inorganic filler (surface of its particles) and the diene elastomer, in particular bifunctional organosilanes or polyorganosiloxanes.

The content of coupling agent is advantageously less than 20 phr, it being understood that it is generally desirable to use as little as possible thereof. Typically, the content of coupling agent represents from 0.5% to 15% by weight relative to the amount of inorganic filler. Its content is preferentially between 0.5 and 12 phr, more preferentially within a range extending from 3 to 10 phr. This content is easily adjusted by those skilled in the art depending on the content of inorganic filler used in the composition.

According to another variant of the invention, the reinforcing filler may comprise another organic filler, such as, for example, functionalized polyvinylaromatic organic fillers as described in applications WO-A-2006/069792 and WO-A-2006/069793, then respecting a total content of organic filler of less than 20 phr, preferably less than 10 phr, more preferentially less than or equal to 8 phr and even more preferentially less than or equal to 5 phr.

Inert (i.e. non-reinforcing) fillers, such as particles of clay, bentonite, talc, chalk, kaolin, at a content of less than or equal to 10 phr and preferentially less than or equal to 5 phr, may also be added to the reinforcing filler described above.

Various additives

The rubber compositions in accordance with the invention may also comprise all or a portion of the usual additives generally used in the elastomer compositions intended for the manufacture of tyres, in particular of treads, such as, for example, plasticizing agents or extending oils, whether the latter are aromatic or non-aromatic in nature, pigments, protection agents, such as antiozone waxes, chemical antiozonants or antioxidants, antifatigue agents, reinforcing resins, methylene acceptors (for example phenolic novolak resin) or methylene donors (for example HMT or H3M), as described, for example, in Application WO 02/10269 (or US2003-0212185), a crosslinking system based either on sulphur or on sulphur-donating agents and/or on peroxide and/or on bismaleimides, vulcanization accelerators or vulcanization activators, with zinc-based activators of course being excluded.

Preferably, these compositions comprise, as preferred non-aromatic or very weakly aromatic plasticizing agent, at least one compound selected from the group consisting of naphthenic oils, paraffinic oils, MES oils, TDAE oils, glycerol esters (in particular trioleates), plasticizing hydrocarbon resins having a high Tg preferably of greater than 30° C., and the mixtures of such compounds.

Mention will especially be made, among the above plasticizing hydrocarbon resins (it will be remembered that the name "resin" is reserved by definition for a solid compound), of resins formed of homo- or copolymers of alpha-pinene, beta-pinene, dipentene or polylimonene, $C_5$ fraction, for example formed of $C_5$ fraction/styrene copolymer, which can be used alone or in combination with plasticizing oils, such as MES or TDAE oils.

The overall content of such a plasticizing agent is less than or equal to 10 phr and preferably less than or equal to 5 phr, and even more preferentially less than or equal to 2 phr.

Manufacture of the rubber compositions

The rubber compositions of the invention are manufactured in appropriate mixers, using two successive phases of preparation according to a general procedure well known to those skilled in the art: a first phase of thermomechanical working or kneading (sometimes referred to as a "non-productive" phase) at high temperature, up to a maximum temperature of between 130° C. and 200° C., preferably between 145° C. and 185° C., followed by a second phase of mechanical working (sometimes referred to as a "productive" phase) at lower temperature, typically below 120° C., for example between 60° C. and 100° C., during which finishing phase the crosslinking or vulcanization system is incorporated.

According to a preferential embodiment of the invention, all the base constituents of the compositions of the invention, with the exception of the vulcanization system, namely the reinforcing filler and the coupling agent where appropriate, are intimately incorporated, by kneading, in the diene elastomer during the first "non-productive" phase, that is to say that at least these various base constituents are introduced into the mixer and are thermomechanically kneaded, in one or more steps, until the maximum temperature of between 130° C. and 200° C., preferably of between 145° C. and 185° C., is reached.

By way of example, the first (non-productive) phase is carried out in a single thermomechanical step during which all the necessary constituents, especially the coupling agent, the optional supplementary covering agents or processing aids and various other additives, with the exception of the vulcanization system, are introduced into an appropriate mixer, such as an ordinary internal mixer. The total duration of the kneading, in this non-productive phase, is preferably between 1 and 15 min. After cooling the mixture thus obtained during the first non-productive phase, the vulcanization system is then incorporated at low temperature, generally in an external mixer, such as an open mill; everything is then mixed (productive phase) for a few minutes, for example between 2 and 15 min.

The vulcanization system proper is preferentially based on sulphur and on a primary vulcanization accelerator, in particular on an accelerator of the sulphenamide type. Various known secondary vulcanization accelerators or vulcanization activators, such as, for example, fatty acids, such as stearic acid, guanidine derivatives (in particular diphenylguanidine), may be added to this vulcanization system, incorporated during the first non-productive phase and/or during the productive phase, while respecting a zinc content of the composition ranging from 0.7 to 2 phr and preferably ranging from 1 to 1.5 phr.

The sulphur is used at a preferential content of between 0.5 and 12 phr, in particular between 1 and 10 phr. The primary vulcanization accelerator is used at a preferential content of between 0.5 and 10 phr, more preferentially of between 0.5 and 5.0 phr.

The final composition thus obtained is subsequently calendered, for example in the form of a sheet or a slab, especially for laboratory characterization, or else extruded in the form of a rubber profiled element which can be used, for example, as a tyre tread.

III. Exemplary Embodiments of the Invention

Preparation of the rubber compositions

The following tests are carried out in the following way: the diene elastomer (NR and BR blend), the reinforcing filler, the coupling agent where appropriate, and then, after kneading for one to two minutes, the various other ingredients, with the exception of the vulcanization system, are introduced into an internal mixer which is 70% filled and which has an initial vessel temperature of approximately 90° C. Thermomechanical working is then carried out (non-productive phase) in one step (total duration of the kneading equal to approximately 5 min), until a maximum "dropping" temperature of approximately 165° C. is reached. The mixture thus obtained is recovered and cooled and then the covering agent (when the latter is present) and the vulcanization system (sulphur and sulphenamide accelerator) are added on an external mixer (homofinisher) at 70° C., everything being mixed (productive phase) for approximately 5 to 6 min.

The compositions thus obtained are subsequently calendered, either in the form of slabs (thickness of 2 to 3 mm) or of thin sheets of rubber, for the measurement of their physical or mechanical properties, or in the form of profiled elements which can be used directly, after cutting and/or assembling to the desired dimensions, for example as semi-finished products for tyres, in particular as tyre treads.

Test 1

The aim of this example is to show the improvement in properties obtained for a tyre tread composition in accordance with the invention, relative to several tread compositions, especially a "conventional" control composition for heavy-goods vehicles.

The compositions were manufactured in accordance with the process described in detail in the previous section. These compositions listed in the following Table 1 (where the amounts are expressed in phr, parts by weight per hundred parts of elastomer) differ by the nature of their respective reinforcing filler, and also by the presence of zinc.

The formulations are presented in the following Table 1.

TABLE 1

| | Composition: | | | |
|---|---|---|---|---|
| | A | B | C | D |
| NR (1) | 80 | 80 | 80 | 80 |
| BR (2) | 20 | 20 | 20 | 20 |
| Carbon black (3) | 45 | 45 | 3 | 3 |
| Silica (4) | — | — | 45 | 45 |
| Coupling agent (5) | — | — | 4.5 | 4.5 |
| Wax | 1 | 1 | 1 | 1 |
| Antioxidant (6) | 3 | 3 | 3 | 3 |

TABLE 1-continued

| | Composition: | | | |
|---|---|---|---|---|
| | A | B | C | D |
| ZnO | 2.6 | 1 | 2.6 | 1 |
| Stearic acid | 2 | 2 | 2 | 2 |
| Sulphur | 1.5 | 1.5 | 1.5 | 1.5 |
| Accelerator (7) | 0.9 | 0.9 | 0.9 | 0.9 |

(1) Natural rubber;
(2) BR with 4.3% of 1,2-; 2.7% of trans-; 93% of cis-1,4- (Tg = −106° C.);
(3) Carbon black N234 sold by Cabot Corporation;
(4) Silica, Zeosil 1165MP sold by Rhodia;
(5) TESPT coupling agent (Si69 from Evonik);
(6) N-(1,3-Dimethylbutyl)-N-phenyl-para-phenylenediamine (Santoflex 6-PPD from Flexsys);
(7) N-Cyclohexyl-2-benzothiazole sulphenamide (Santocure CBS from Flexsys).

The compositions A, B, C and D are thus defined as follows:

the control composition A is a "conventional" tread composition for tyres of heavy-goods vehicles, including carbon black as reinforcing filler and 2.6 phr of ZnO, the composition B not in accordance with the invention is a composition identical to the composition A except that the content of ZnO, which has been reduced, is 1 phr, the control composition C not in accordance with the invention is a composition identical to the composition A except for the reinforcing filler which comprises 45 phr of silica and 3 phr of carbon black, the composition D in accordance with the invention is a composition identical to the composition C except for the content of ZnO which has been reduced to 1 phr.

The rubber properties of these four compositions are measured before curing and after curing at 150° C. for 60 minutes; the results obtained are given in Table 2.

TABLE 2

| | Composition: | | | |
|---|---|---|---|---|
| | A | B | C | D |
| Rheometry | | | | |
| $T_i$ | 13.1 | 12.7 | 31.7 | 20.1 |
| Properties before curing | | | | |
| Mooney | 41 | 43 | 40 | 41 |
| Properties after curing | | | | |
| Tan (δ)max | 0.14 | 0.15 | 0.10 | 0.11 |
| G* | 1.49 | 1.48 | 1.35 | 1.45 |

It is observed that the reduction in the zinc content for composition B comprising predominantly carbon black does not lead to any particular effect on the curing phase delay (represented by the value Ti).

As expected, the composition C (comprising very predominantly silica), relative to the compositions A and B, has an improved hysteresis (much lower value of Tan(δ)max) and a longer curing phase delay than that of the compositions comprising carbon black. However, it is very surprisingly observed that the silica-based composition D, which only differs from the composition C in terms of the much lower zinc content (1 phr), enables a very significant reduction in the phase delay, while retaining the observed advantages associated with the use of silica as reinforcing filler. It will be noted, moreover, that the dynamic properties of the composition D have a compromise between stiffness/hysteresis which is overall equivalent to the composition C and a greatly improved hysteresis in comparison to the conventional control A.

Test 2

The aim of this example is to show the entirely astonishing advantage of heavy-goods tyres having a tread of the above composition D in accordance with the invention, relative to tyres comprising a tread of composition C described above.

The tyre treads were manufactured in accordance with the process described above in the description, for tyres of dimensions 315/70 R22.5.

These tyres were mounted on the "drive" axle of a heavy-goods vehicle: a SCANIA brand tractor, SCA R560.

The results obtained following the wear test are presented in the following Table 3:

TABLE 3

|  | Composition: | |
| --- | --- | --- |
|  | C | D |
| Wear performance | 100 | 115 |

It is unexpectedly observed that the tyre having a tread of composition D in accordance with the invention has a very significantly improved wear resistance performance relative to the performance obtained with the tyre, the tread of which has a composition C (which is identical to the composition D except for the amount of zinc: a conventional amount for the composition C and a very reduced amount for the composition D).

The invention claimed is:

1. A tire tread comprising a rubber composition based on:
   at least one natural or synthetic polyisoprene, at a content ranging from 60 phr to 90 phr;
   a reinforcing filler comprising inorganic filler
   a coupling agent;
   a plasticizing agent at a content of less than or equal to 10 phr;
   a sulphur-based crosslinking system; and
   a polybutadiene or a butadiene-styrene copolymer at a content ranging from 10 to 40 phr,
   wherein the rubber composition contains a zinc content ranging from 0.7 to 2 phr.

2. The tire tread according to claim 1, wherein the inorganic filler comprises silica.

3. The tire tread according to claim 1, wherein the inorganic filler consists of silica.

4. The tire tread according to claim 1, wherein the zinc content ranges from 1 to 1.5 phr.

5. The tire tread according to claim 1, wherein the inorganic filler represents at least 60% by weight of the reinforcing filler.

6. The tire tread according to claim 5, wherein the inorganic filler represents at least 75% by weight of the reinforcing filler.

7. The tire tread according to claim 6, wherein the inorganic filler represents at least 90% of the reinforcing filler.

8. The tire tread according to claim 1, wherein the rubber composition is further based on a third diene elastomer different from the other elastomers, said third diene elastomer selected from the group consisting of polybutadienes, styrene-butadiene copolymers, isoprene-butadiene copolymers, isoprene-styrene copolymers and isoprene-butadiene-styrene copolymers.

9. The tire tread according to claim 1, wherein a total content of reinforcing filler ranges from 30 to 90 phr.

10. The tire tread according to claim 9, wherein the total content of reinforcing filler ranges from 40 to 80 phr.

11. The tire tread according to claim 10, wherein the total content of reinforcing filler ranges from 45 to 70 phr.

12. The tire tread according to claim 1, wherein the content of plasticizing agent is less than or equal to 5 phr.

13. The tire tread according to claim 4, wherein the content of plasticizing agent is less than or equal to 2 phr.

14. A tire comprising a tread according to claim 1.

* * * * *